(12) United States Patent
Chance et al.

(10) Patent No.: US 6,702,542 B1
(45) Date of Patent: Mar. 9, 2004

(54) LUGGAGE TRANSPORTER AND LOADER AND METHOD THEREFOR

(75) Inventors: Charles O. Chance, Burlingame, CA (US); Robert G. Derusha, Menominee, MI (US)

(73) Assignee: Premier Engineering & Manufacturing, Inc., Marinette, WI (US)

( * ) Notice: Subject to any disclaimer, the term of this patent is extended or adjusted under 35 U.S.C. 154(b) by 0 days.

(21) Appl. No.: 10/084,117

(22) Filed: Feb. 26, 2002

(51) Int. Cl.$^7$ .................................. B60P 1/38
(52) U.S. Cl. ..................... 414/347; 414/495; 414/809
(58) Field of Search ........................ 414/347, 393, 414/398, 399, 495, 528, 809

(56) References Cited

U.S. PATENT DOCUMENTS

| | | | |
|---|---|---|---|
| 2,634,870 A | * | 4/1953 | Barnum |
| 2,883,079 A | * | 4/1959 | Binns |
| 3,044,641 A | * | 7/1962 | Code |
| 3,126,112 A | * | 3/1964 | Shaw et al. |
| 3,524,558 A | * | 8/1970 | Mastracci et al. |
| 3,604,576 A | | 9/1971 | Poccard |
| 3,687,321 A | * | 8/1972 | Goodhart et al. ........... 214/512 |
| 3,944,096 A | | 3/1976 | Carder |
| 4,051,565 A | * | 10/1977 | Berge ........................ 5/81 B |
| 4,304,518 A | | 12/1981 | Carder et al. |
| 4,348,150 A | * | 9/1982 | Inghram et al. ............ 414/529 |
| 4,492,504 A | | 1/1985 | Hainsworth |
| 4,679,381 A | * | 7/1987 | Truninger ................... 53/447 |
| 4,690,606 A | | 9/1987 | Ross |
| 5,094,337 A | * | 3/1992 | Van Veldhuisen et al. .. 198/357 |
| 5,325,953 A | * | 7/1994 | Doster et al. ............... 198/304 |
| 5,848,870 A | * | 12/1998 | Smith et al. ................ 414/540 |
| 6,447,044 B1 | * | 9/2002 | Buker et al. ............... 296/99.1 |

* cited by examiner

*Primary Examiner*—Thomas J. Brahan
(74) *Attorney, Agent, or Firm*—Denise L. Stoker; Godfrey & Kahn, S.C.

(57) ABSTRACT

An apparatus and method for loading and unloading articles such as luggage to a passenger vehicle or storage area. The apparatus is a single bed connected to a transport device. The elevation of the bed may be adjustable to be brought close to the platform or cargo area where luggage pieces are kept. A ramp member extends from the bed. The bed is generally a large conveyor that is smooth and continuous so that luggage wheels, straps, handles or the like cannot become lodged.

12 Claims, 4 Drawing Sheets

LUGGAGE TRANSPORTER AND LOADER AND METHOD THEREFOR

FIELD OF THE INVENTION

This invention relates generally to article handling devices, and in particular to a luggage handling device for transporting, loading, and unloading luggage from aircraft or other types of transport equipment and/or storage locations.

BACKGROUND

The article handling vehicle of the invention is designed to facilitate transporting, loading, and unloading of passenger luggage (baggage) in conjunction with aircraft, or other types of transport vehicles such as trains, cruise ships or the like. Currently, passenger luggage is loaded and unloaded from transport vehicles using a conveyor, a train of several cargo carts, a tractor, and typically three employees. Specifically, out-bound luggage is manually lifted from an airport or freight facility conveyor system, and placed onto cargo carts. The carts are then towed to the plane. At the plane side, the luggage is again manually lifted from the cargo carts and placed on a motorized conveyor. The conveyor transfers the cargo up an inclined belt to the cargo hold level of the aircraft. At the aircraft level, the luggage is again manually lifted off of the conveyor and positioned in the cargo pit. This process is repeated in reverse after the aircraft arrives at a destination.

The current method of transporting, loading and unloading luggage from aircraft is problematic for several reasons. First, it requires a significant amount of labor, usually two or three persons capable of lifting the required weight. Second, such personnel are at risk of back injuries, hernias and other problems caused by lifting luggage that is heavy or awkward to handle. Such injuries increase company medical expenses and may cause permanent physical problems and financial hardship for the employee. Third, a train of cargo carts takes up significant space whether they are in use or in storage.

Accordingly, a need exists for an apparatus that is compact and reduces the labor needed to load and unload luggage to and from an aircraft or other transport.

BRIEF SUMMARY

The present invention provides an apparatus and method for loading and unloading luggage or cargo to or from a cargo-carrying vehicle, aircraft, boat, truck, or other transportation machine. Generally, the apparatus is a bed connected to a transport device. In one embodiment, the elevation of the bed can be selectively changed so it can be brought close to the platform or cargo area where luggage pieces are kept. The bed is generally smooth to reduce the possibility that luggage wheels or other features will get attached to or caught within the conveyor. A ramp member extends from the bed, and also has a surface that reduces the possibility of luggage becoming attached or caught thereon.

The conveyor may be a large single conveyor that has a relatively low coefficient of friction so that luggage accumulating on the bed does not impede the movement of the conveyor.

In contrast, the ramp extending from the bed has a relatively high coefficient of friction to aid in transporting separated pieces of luggage onto or away from the bed.

In one embodiment of the present invention, a door or pair of doors is used as guides to keep the luggage pieces from jamming as they exit the bed. Further, a pair of side walls and a rear wall are used to keep the accumulated luggage from failing off of the bed during loading and transport. In another embodiment of the present invention, the driver cab of the transport device may be raised or lowered with the bed so that the operator driving the transport vehicle can more easily gain access thereto. In another embodiment of the present invention, the bed has a pair of side-by-side conveyor belts thereon for the purpose of preventing or remedying jams on the conveyor belt.

In operation, luggage pieces are loaded onto the bed, preferably from the ramp member. Once the desired amount of luggage pieces are placed onto the conveyor, the apparatus is either transported to another area to pick up more luggage, or is transported to a place where it will unload the luggage pieces. If necessary, the bed is raised and ramp angle adjusted. When necessary, luggage pieces are jostled to prevent jams. To transport luggage pieces from a cargo hold or the like to another place, this process is reversed.

While the present invention is particularly useful for loading and unloading luggage to and from aircraft, other applications are possible and references to use with aircraft should not be deemed to limit the application of the present invention. The present invention may be advantageously adapted for use where similar performance capabilities and characteristics are desired, such as in other passenger transport industries, or in factories and package delivery businesses where packages of odd shapes and sizes need to be transported from one place to another. These and other objects and advantages of the present invention will become apparent from the detailed description, claims, and accompanying drawings.

DETAILED DESCRIPTION

Figure 1:
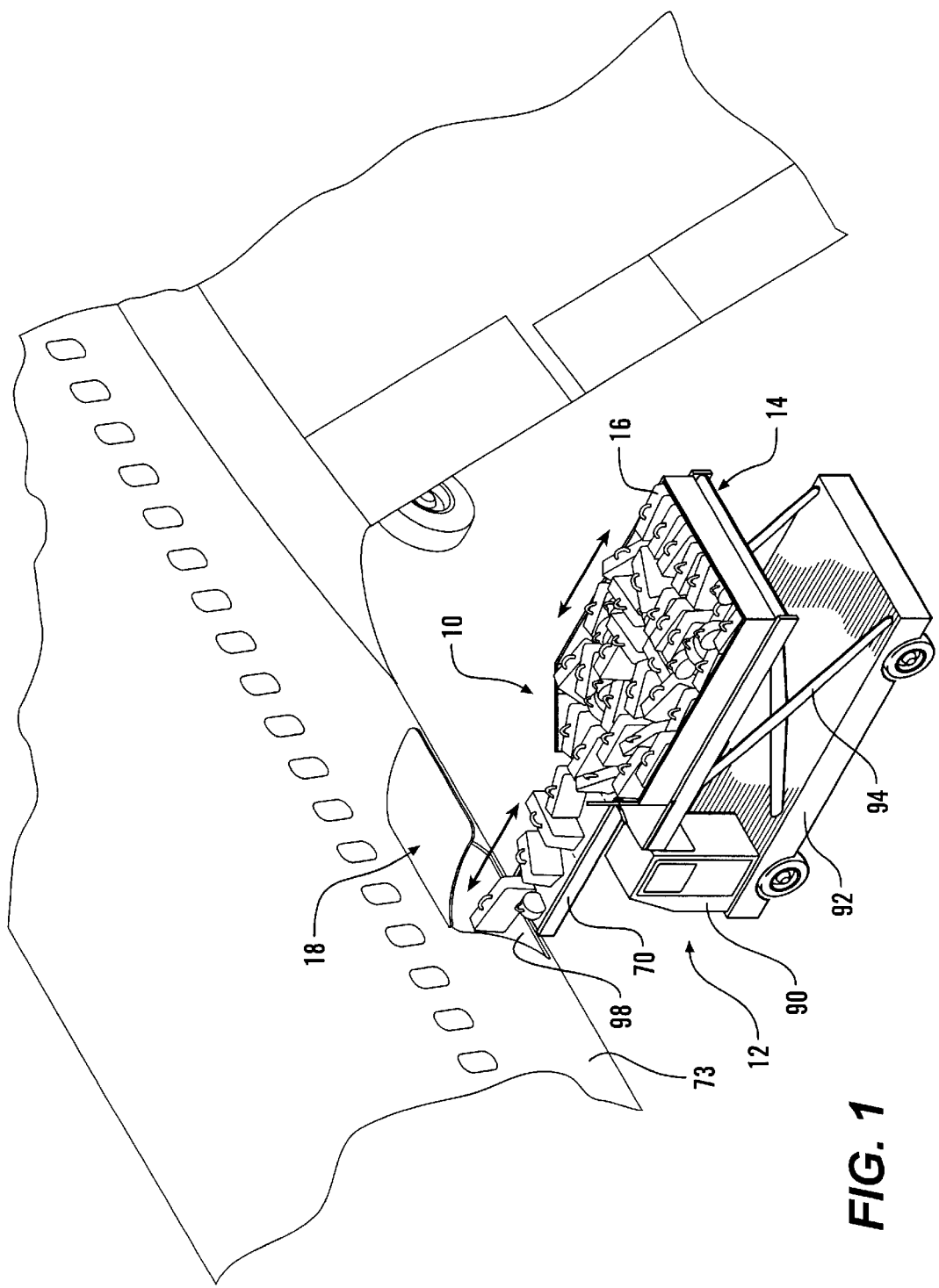
FIG. 1 is a rear perspective view of one embodiment of the present invention showing luggage pieces being loaded from the elevated bed into an aircraft cargo hold.

Referring to FIG. 1, the apparatus 10 of the present invention is a vehicle 12 having a bed 14 for transporting passenger luggage between two points, such as between a terminal and an aircraft or cruise ship or between a loading dock and a warehouse storage unit. Vehicle 12 may be any type of vehicle having the capability to lift bed 14 to an elevated position for unloading or loading. One of the most commonly available vehicles having such capability is a hydraulic scissor lift truck as shown. Bed 14 is in effect, a large, selectively reversible conveyor that can be positioned to move luggage pieces 16 either to or from a location such as the aircraft cargo hold 18 shown in FIG. 1.

Figure 2:
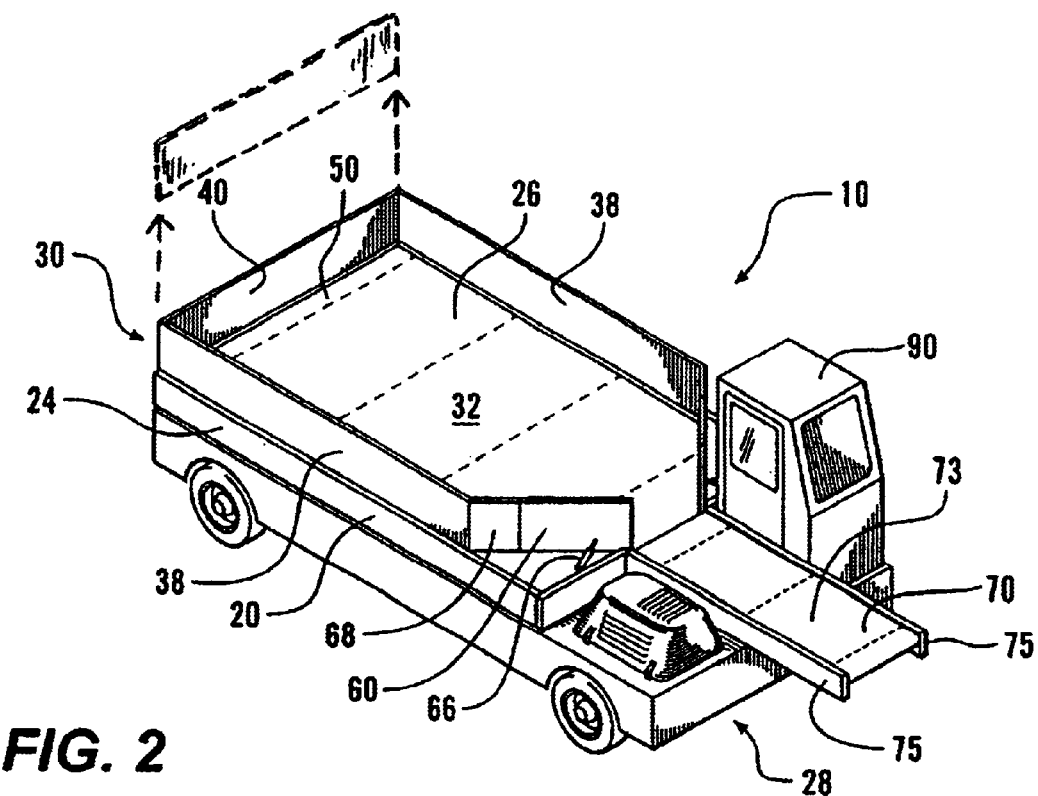
FIG. 2 is a front perspective view of the apparatus in FIG. 1, where the empty bed is lowered for transport.
Figure 4:
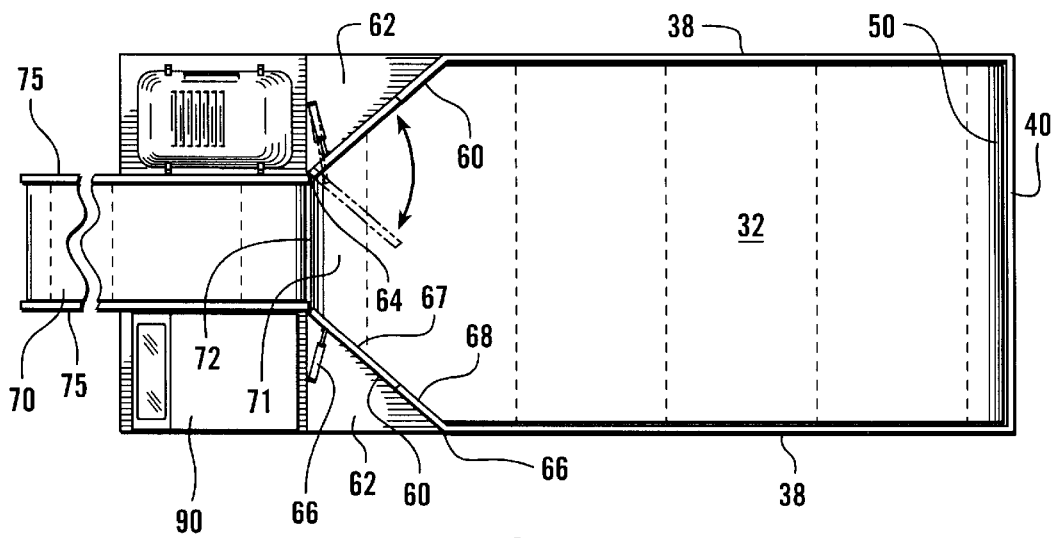
FIG. 4 is a plan view of the apparatus of FIG. 2.

Referring now to FIGS. 2 and 4, bed 14 may be comprised of a tray-like frame 20 having an optional bottom 22, and two opposing sides 24 on each side. Extending between sides 24 is a single continuous conveyor 26 that can rotate toward the front end 28 or the back end 30 of vehicle 12. Conveyor 26 preferably has the characteristics of (1) being able to carry the maximum amount of luggage pieces 16 that can fit on bed 14, (2) having an accumulator belt with a low-friction surface 32 (e.g. Intralox Series 1400 (remove Style FT) manufactured by Intralox, Inc., Harahan, La.), and (3) having a driving motor with enough power so that a full load of luggage held stationary on bed 14 will not impede movement of the conveyor system 26. Further, it is desirable that the belt is adjustable for tension, resists abrasion from luggage hinges, handle, wheels or the like, and is easily replaceable.

Figure 3:
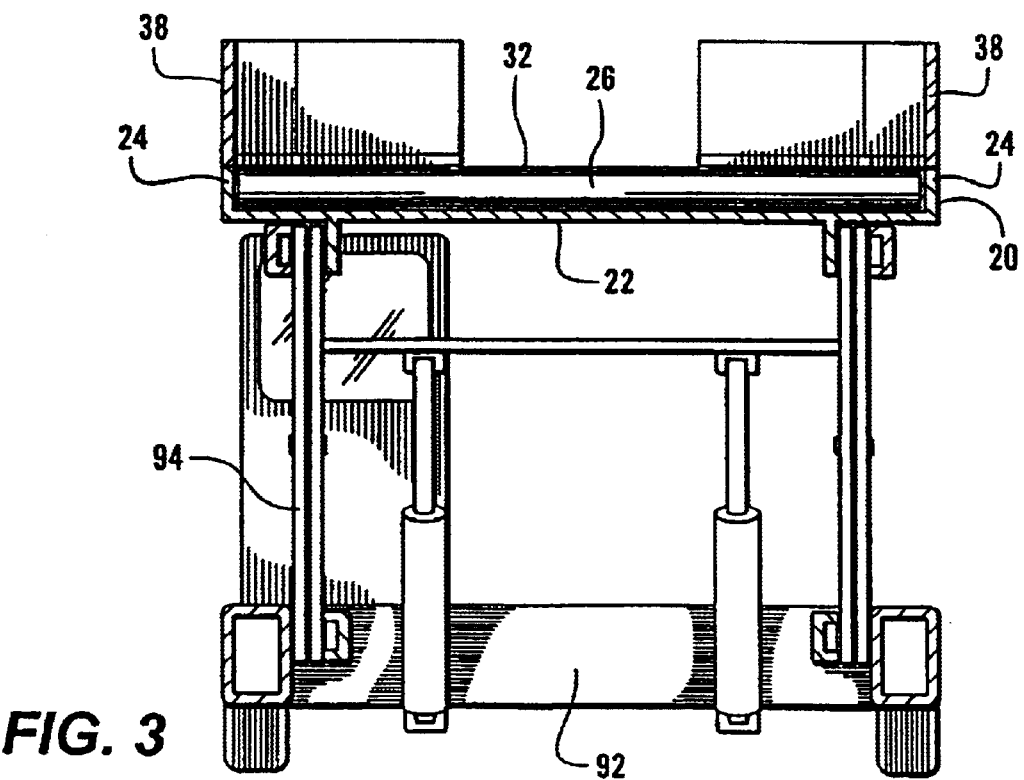
FIG. 3 is a rear partial cross-sectional view of the apparatus shown in FIG. 5, taken generally along line 3—3 in FIG. 5.

A pair of opposing side walls 38 and a rear wall 40 are preferably attached to the top side of frame 20 to prevent luggage pieces from falling off during transport or loading. Side walls 38 may be attached directly over tray sides 24 as seen in FIGS. 3 and 4 to possibly prevent luggage straps or the like from becoming caught between conveyor surface 32 and a side wall 38. Side walls 38 may vary in height and are smooth so that luggage slides easily against walls 38. It may be preferable to use stake panels (not shown) so they can be removed for conveyor maintenance.

The rear wall 40 spans the distance between side walls 38. Rear wall 40 may be removable for maintenance, and may open for rear loading or unloading of bed 14. Preferably, there is only a slight gap between rear wall 40 and the rear edge 50 of bed 14 so that luggage straps or the like cannot get pulled underneath bed 14. Rear wall 40 has a stiffness or is attached to frame 20 such that the pressure caused by loading a full bed of luggage onto apparatus 10 does not allow rear wall 40 to deflect significantly. For this reason, it is preferable to either have a hinged connection (not shown) between the top edge of frame 20 and the bottom edge of rear wall 40, or use a removable stake panel (not shown).

Figure 5:
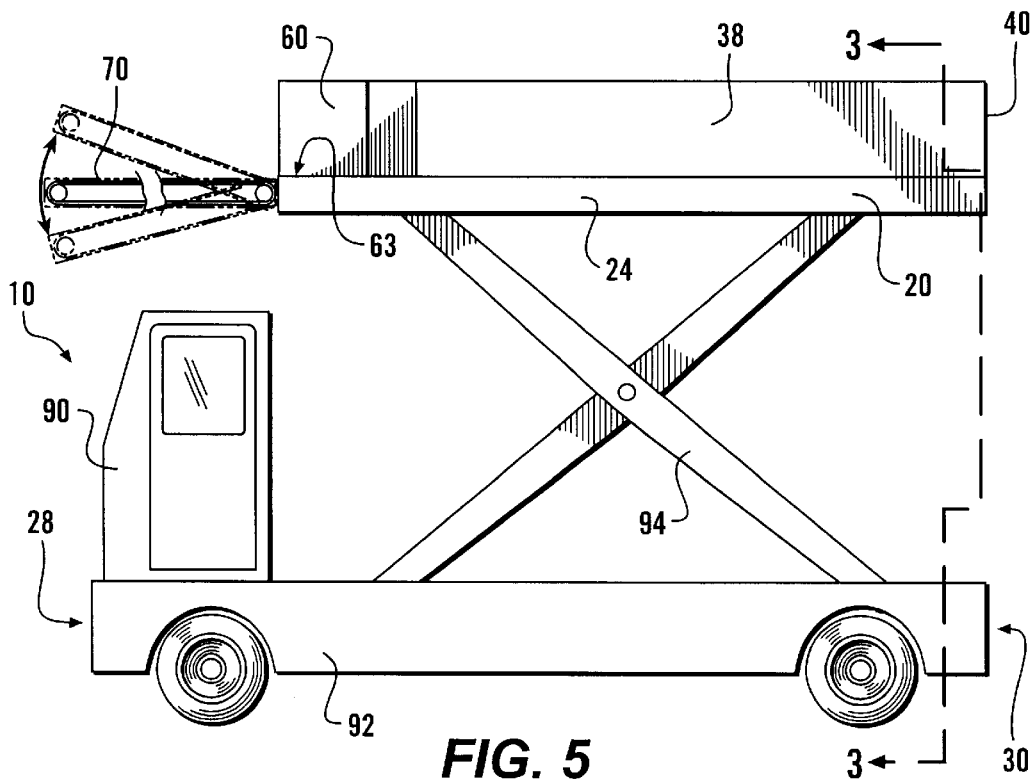
FIG. 5 is a side elevational view of the apparatus in FIG. 1.

Referring now to FIGS. 4 and 5, doors. 60 are angled to create a funnel-type opening between a reversible ramp 70 and conveyor 26. A pair of operator platforms 62 may cover the resulting triangular area between walls 60 and corners of frame 20. This serves as a place where an operator may stand, and also serves as a safety feature by covering the portion of the conveyor 26 that is not loaded with luggage.

Doors 60 may be stationary so that each door operates as a wall, or they may be moveable so that they can be used to jostle the luggage and breakup any bottlenecks that may occur as the conveyor 26 is operating to deliver luggage 16 to ramp 70. For example, doors 60 may be have a hinged connection 64 to frame 20 or platform 62, and be moved with hydraulic or pneumatic actuators 66 as shown in FIG. 4. The length of doors 60 may extend from hinged connection 64 to side walls 38. Preferably, doors 60 extend between hinged connection 64 and a stationary walls 68, as shown in FIG. 4. When in a closed position, doors 60 and stationary wall 68 lie in a parallel plane so that it appears to be a continuous wall.

Referring to FIG. 4, ramp 70 extends outwardly from the front edge 71 of conveyor 26. Preferably, ramp 70 has a width spanning the opening between doors 60. Ramp 70 is a conveyor with a continuous belt 73 that is preferably of a relatively high friction material so that luggage does not easily slide thereon. This allows ramp 70 to push luggage pieces 16 to their intended destinations. Belt 73 has a pair of sides 75 that may be relatively low as shown, or be higher so that luggage pieces 16 cannot easily fall therefrom.

Ramp 70 generally operates in the same direction as conveyor 26. Ramp 70 and conveyor 26 may be driven by a single motor (not shown). In another embodiment of the present invention, ramp 70 and conveyor 26 may be operated by separate motors or have a transmission (not shown) in order to be selectively operable in separate directions. This would make it possible to clear any small items accidentally caught in the small gap 72 between ramp 70 and conveyor 26. Preferably, as seen in FIGS. 1 and 5, ramp 70 is pivotally connected to the bed 14 with reference to a horizontal plane in order to move up and down some slight degree with the aircraft body 73. Such movement of ramp 70 may operate using limit switches (not shown) to cause bed 14 to be driven up or down in accordance with any significant movement of the aircraft body or the like.

Figure 6:
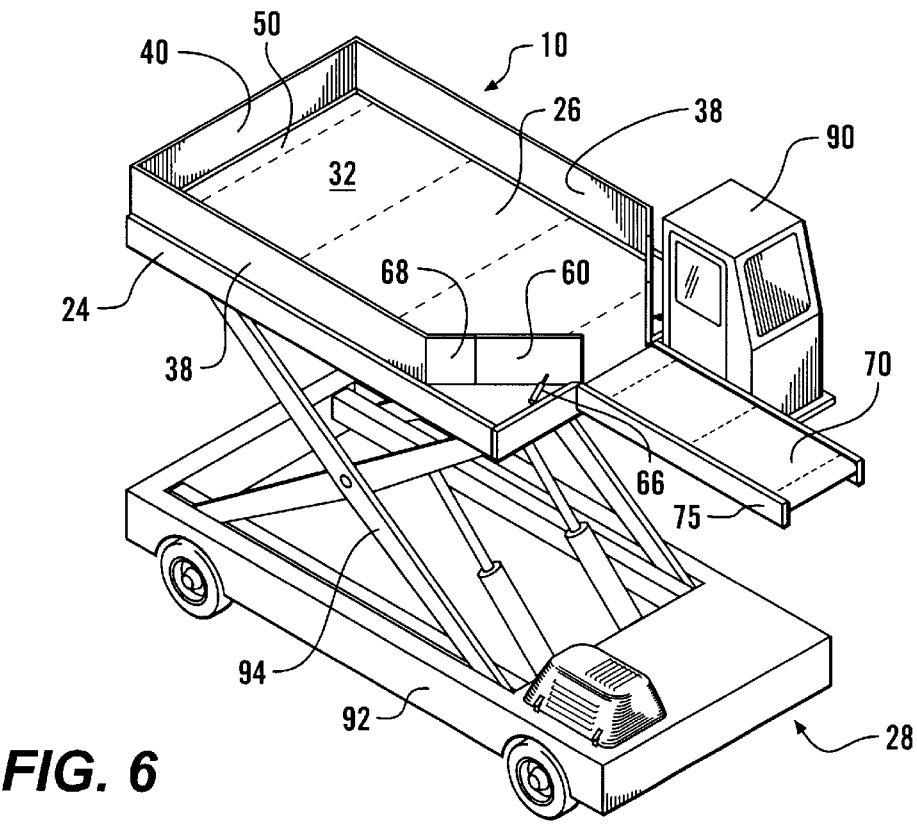
FIG. 6 is one alternative embodiment showing the vehicle cab connected to the bed.
Figure 7:
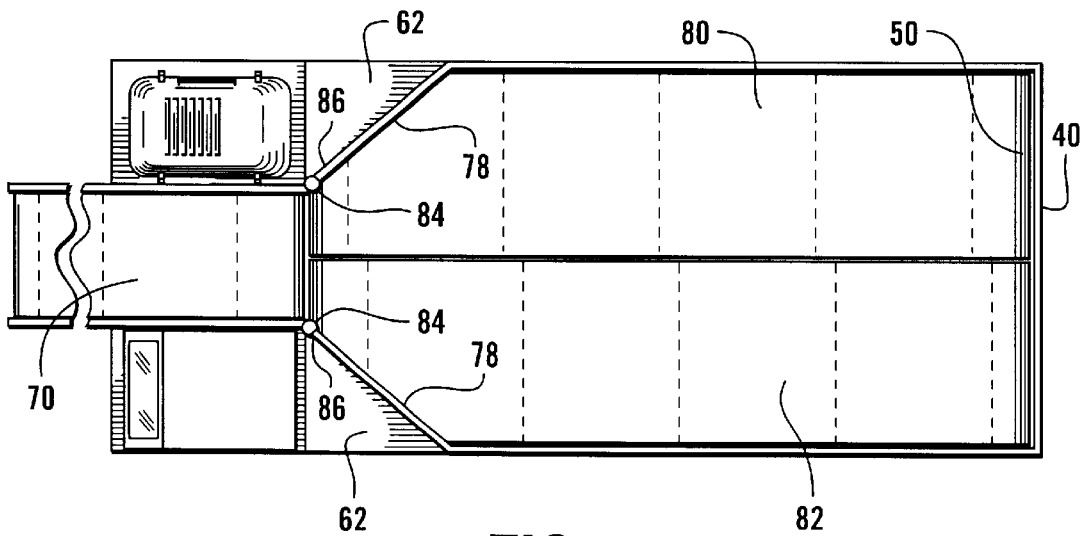
FIG. 7 is one alternative embodiment of the bed having a pair of side-by-side conveyors.

In an alternative embodiment of the present invention, shown in FIG. 6, doors 60 are replaced by a continuous stationary wall 78, and the conveyor 26 is split into a pair of side-by-side conveyors 80 and 82. Conveyors 80 and 82 have the same characteristics as full conveyor 26. Preferably, conveyors 80, 82 can be operated in different directions with respect to one another, and have variable speeds. This will allow the operator to better control the flow of luggage pieces as they exit or enter the conveyors 80, 82. To prevent luggage from being unduly abraded or becoming caught on wall 78, a rollers 84 may be positioned adjacent to the vertical edge 86 of wall 78.

Referring now to FIGS. 5 and 6, vehicle 12 may have a cab enclosure 90 as shown or at least a seat without an enclosure. A driver operates vehicle 12 from the driver seat (not shown). In the preferred embodiment, this seat and optional enclosure 90 may be connected to bed 14 so that it is raised and lowered with bed 14 as shown in FIG. 6. This will allow the driver easier access to the conveyor 26. In the embodiment shown in FIG. 5, the seat and enclosure are connected to the chassis 92 of vehicle 12. Connected to chassis 92 may be a hydraulic scissor lift system 94 or the like. Controls (not shown) are used to change the direction of conveyor 26 (or belts 80, 82) or ramp belt 73, and to possibly adjust the speed of the same. Controls would also be used to operate the scissor lift and optional doors 60. These controls may be located near the driver seat so that the operator of vehicle 12 can easily access them. In another embodiment, the controls are instead or in addition located near platforms 62 so that the operator of apparatus 10 can stand near the ramp 70 and bed 14 while the luggage is being loaded or unloaded. In yet another embodiment, an even more convenient control is remotely accessed, so that the driver of vehicle 10 could perform the entire loading and unloading process from the driver seat, platform 62 or even from the ground or cargo hold. Thus, a remote control, for conveyors 26 or belts 80, 82, ramp belt 73 and optional doors 60 would enable a single person to perform the entire loading and unloading of apparatus 10.

In operation, luggage pieces 16 are loaded onto conveyor 26, preferably from ramp 70. In this instance ramp 70 and conveyor 26 are moving in the same direction. Once the desired amount of luggage pieces are placed onto the conveyor 26, the apparatus 10 is either transported to another area to pick up more luggage, or is transported to a place where it will unload the luggage pieces 16, such as an aircraft cargo hold 18 as seen in FIG. 1. If necessary, the bed 14 is raised and ramp 70 adjusted so that luggage pieces 16 can move from conveyor 26, to ramp 70 and into the cargo hold without getting caught between the ramp and the floor 98 of cargo hold 18 or the like. When necessary, luggage pieces are jostled to prevent jams by moving doors 60 or by reversing the directions of belts 80, 82 or by varying the speed of belts 80, 82, with respect to one another. To transport luggage pieces 16 from the cargo hold 18 or the like to another place, this entire process is reversed. However, it may be unnecessary to jostle the luggage pieces as they are collected onto conveyor 26.

Although the invention has been herein shown and described in what is perceived to be the most practical and preferred embodiments, it is to be understood that the invention is not intended to be limited to the specific embodiments set forth above. Accordingly, it is recognized that modifications may be made by one skilled in the art of the invention without departing from the spirit or intent of the invention and therefore, the invention is to be taken as including all reasonable equivalents to the subject matter of the appended claims. It is to be understood that the invention may be used in connection with the transportation of a wide variety of shapes and sizes of goods in a number of different embodiments.

We claim:

1. A cargo handling apparatus for aircraft for loading and unloading a single layer of articles that are of random shapes, sizes and arrangement, said apparatus comprising:

a bed connected to a transport device having an extension unit for selectively changing the elevation of the bed, wherein the bed is a continuous conveyor belt that has a surface with a low coefficient of friction such that the articles slide thereon; and a ramp member extending from the bed, the ramp member having a surface with a high coefficient of friction such that the ramp member can effectively move the articles to and from the bed.

2. The apparatus of claim 1 further including two side walls on opposing sides of the bed.

3. The apparatus of claim 2 further including a rear wall connected between the two side walls, and located near an end of the bed.

4. The apparatus of claim 3 wherein the rear wall can be selectively moved between an open and a closed position.

5. The apparatus of claim 3 further including a first door that is connected with a hinge adjacent the front edge of the bed so that it can selectively rotate about the hinge.

6. The apparatus of claim 5 further including an actuator connected to the first door for actuating rotation about the hinge.

7. The apparatus of claim 5 further including a second door that is connected with a hinge to the remaining one of the side walls so that it can selectively rotate about the hinge.

8. The apparatus of claim 2 further including a first stationary door and a second stationary door, wherein the first stationary door is connected to one of the side walls and the second stationary door is connected to the remaining one of the side walls.

9. The apparatus of claim 1 wherein the transport device having an extension unit comprises a lift truck.

10. The apparatus of claim 1 wherein the ramp member is connected to the bed so that it can rotate with respect to an edge of the bed.

11. A method of loading, transporting and unloading articles to an aircraft comprising the steps of:

positioning a bed to a desired position with respect to the aircraft; and ensuring the bed has a lower coefficient of friction than a conveyor ramp that is connected to the bed;

placing articles onto the conveyor ramp connected to the bed, the conveyor ramp capable of conveying the articles from the ramp and onto the bed;

repeating the step of placing articles onto the conveyor ramp until the bed is ready to be transported;

transporting the bed to an aircraft for unloading;

causing the bed to convey the articles placed thereon from the bed to the ramp; and maintaining the bed in a horizontal position during loading and unloading.

12. The method of claim 11 further including the step of guiding the articles from the bed onto the ramp.

* * * * *